United States Patent [19]
Gassmann et al.

[11] Patent Number: 5,711,616
[45] Date of Patent: Jan. 27, 1998

[54] BEARING SEAL FOR PROVIDING STATIC AND DYNAMIC BARRIERS

[75] Inventors: Roland Gassmann, Thannenkirch, France; Graham Sturman, Northampton, England; Roland Duval, Bennwihr, France

[73] Assignee: The Timken Company, Canton, Ohio

[21] Appl. No.: 628,092

[22] Filed: Apr. 9, 1996

[30] Foreign Application Priority Data

Apr. 10, 1995 [GB] United Kingdom ............... 9507430

[51] Int. Cl.$^6$ .................................................. F16C 33/76
[52] U.S. Cl. .................... 384/482; 384/485; 384/486; 384/489
[58] Field of Search .................... 384/477, 481, 384/482, 484, 485, 486, 489

[56] References Cited

U.S. PATENT DOCUMENTS

| | | |
|---|---|---|
| 3,519,316 | 7/1970 | Gothberg . |
| 3,594,050 | 7/1971 | Goldberg . |
| 3,614,183 | 10/1971 | Berens . |
| 3,658,395 | 4/1972 | Hallenbach ............... 384/482 |
| 3,770,992 | 11/1973 | Veglia ........................ 384/489 |
| 3,844,631 | 10/1974 | Otto et al. ................. 384/482 |
| 3,856,368 | 12/1974 | Andersen . |
| 3,858,950 | 1/1975 | Otto ........................... 384/489 |
| 4,043,620 | 8/1977 | Otto ........................... 384/485 |
| 4,692,040 | 9/1987 | Ebaugh et al. ........... 384/484 |
| 4,799,808 | 1/1989 | Otto ........................... 384/481 |
| 4,872,770 | 10/1989 | Dickinson ................. 384/484 |
| 5,213,342 | 5/1993 | Weber ....................... 384/485 |

FOREIGN PATENT DOCUMENTS

| | | |
|---|---|---|
| A 0304160 | 2/1989 | European Pat. Off. . |
| 0059662 | 6/1954 | France ....................... 384/489 |
| A 2512913 | 3/1983 | France . |
| A 2011824 | 11/1970 | Germany . |
| 9213374 U | 2/1994 | Germany . |
| A 1286872 | 8/1972 | United Kingdom . |
| 1298144 | 11/1972 | United Kingdom . |
| 2105797 | 3/1983 | United Kingdom . |
| 8910505 | 11/1989 | WIPO ....................... 384/482 |
| 9408159 | 4/1994 | WIPO . |

*Primary Examiner*—Daniel P. Stodola
*Assistant Examiner*—Matthew A. Kaness
*Attorney, Agent, or Firm*—Polster, Lieder, Woodruff & Lucchesi, L.C.

[57] ABSTRACT

A bearing seal (10) has a casing 11 with a dynamic sealing element (18) such as an EHD at an inner edge. At the outer edge of the casing (11) a static sealing element (14) is provided on an axially extending flange (13). The static sealing element (14) includes opposing outwardly projecting sealing lips (23) which are capable of deflection and which have an outer diameter greater than the diameter of the bearing housing bore when unrestrained. The bearing seal (10) seals the inner and outer race rings of a bearing dynamically and also the outer race ring with the bearing housing statically and positively.

19 Claims, 2 Drawing Sheets

1

BEARING SEAL FOR PROVIDING STATIC AND DYNAMIC BARRIERS

BACKGROUND OF THE INVENTION

The present relates to a bearing seal and particularly to a bearing seal for use in sealing between the inner and outer races of a bearing having for example tapered, cylindrical or ball rolling elements.

The present invention provides a bearing seal comprising a substantially rigid radially extending sealing structure having at an inner edge region a dynamic sealing element and having at an outer edge region a static sealing element which extends axially away from the sealing structure the static sealing element including at least one deformable projection extending radially outwardly from the static sealing element.

With the present invention the bearing seal is arranged to provide a dynamic seal with respect to the inner race of a bearing and in addition a static seal between the outer race of the bearing and a housing. In this way two separate sealing functions are met in a single component. Moreover, with the deformable projection provided on the static sealing element a positive seal can be achieved between the outer race and the housing even where the bearing is clamped in position within the housing with the outer race of the bearing otherwise a loose fitting within the housing.

In an alternative aspect the present invention provides a bearing having an inner race ring, an outer race ring and rolling elements therebetween in combination with a bearing seal as described above, the outer race ring of the bearing including a recess open to an axial outer face of the race ring for receiving the static sealing element of the bearing seal.

DESCRIPTION OF THE DRAWINGS

Embodiments of the present invention will now be described byway of example with reference to the accompanying drawings, in which.

DETAILED DESCRIPTION

Figure 1:
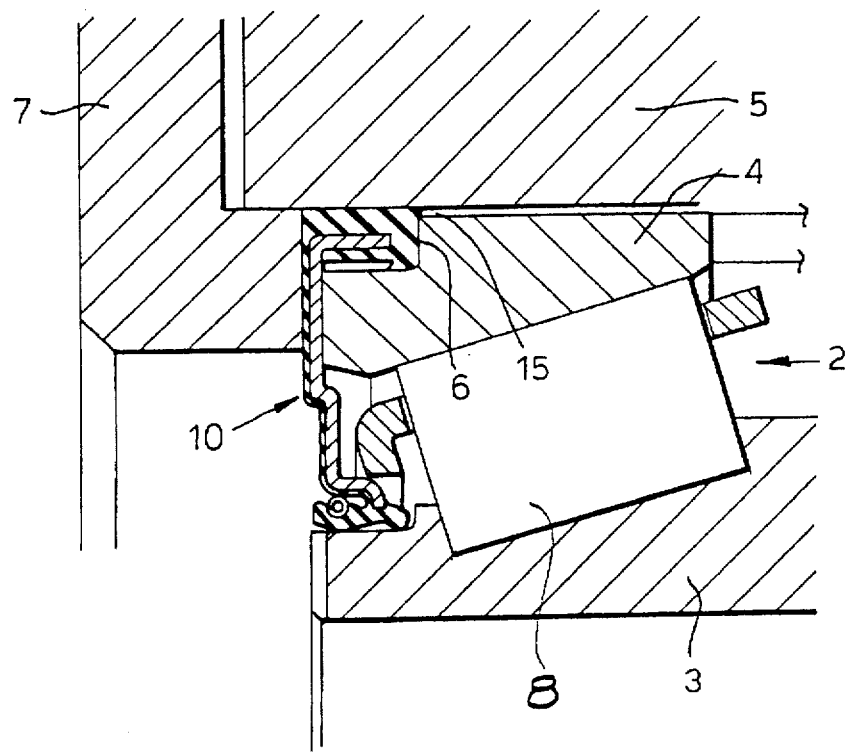
FIG. 1 is a sectional view through a tapered roller bearing having a bearing seal in accordance with the present invention.

The integral bearing seal 10 shown in FIG. 1 functions to form a seal between the static 4 and rotating 3 elements of a bearing 2—specifically, between a static outer ring 4 and a rotating inner ring 3 which revolves in the static ring 4 on rolling elements 8—and also to form a seal between the static element or outer ring 4 of the bearing 2 and the housing 5 in which the bearing 2 is mounted. Thus, the bearing seal 10, being a single component, performs two separate sealing functions. The bearing seal 10 has a substantially rigid casing 11, for example made of steel, which is generally planar and ring-shaped to enable the bearing seal 10 to be located about a rotating shaft (not shown). On the axially outwardly facing surface of the casing 11 there is a coating 12 of a rubber or other resilient material. The coating 12, which may include a circular ridge 12' as shown, provides a sealing surface so that the bearing seal 10 can form a seal with the surface of a clamping member 7 which is used to hold the bearing 2 in position within the housing 5 when the bearing 2 is loose fitting. For certain types of steel suitable for use in the manufacture of the casing 11, the coating 12 may be dispensed with.

Figure 2:
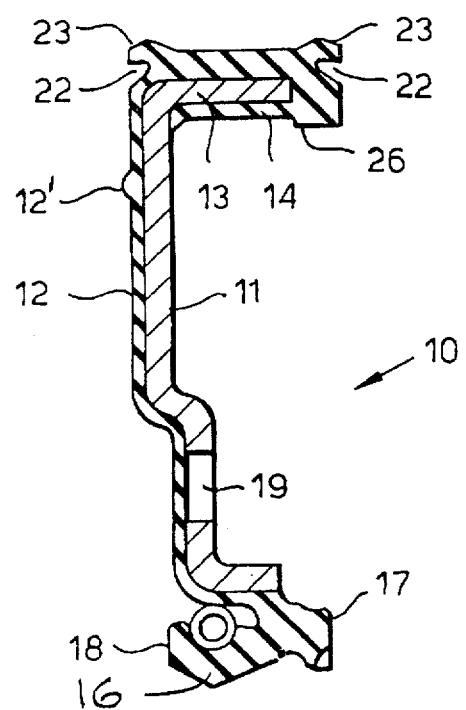
FIG. 2 is an enlarged sectional view of the bearing seal of FIG. 1.

At the radial outer edge of the casing 11 an axially inwardly extending flange 13 is provided which is enveloped in a static sealing member 14. The static sealing member 14 may be made of a rubber material or an alternative resilient material having the characteristics of acting as a barrier to the escape of grease or the ingress of water/emulsion and other contaminants. At opposed axial edges of the static sealing member 14 deformable lips 23 are provided, each of which extend radially outwardly beyond the outer surface of the static sealing member 14 when unrestrained. Thus, the outer radial diameter of the lips 23 is greater than the outer diameter of the static sealing member 14. The outer diameter of the lips 23 is also greater than the diameter of the housing bore 15 when the lips 23 are unrestrained. The static sealing member 14 also includes respective grooves 22 adjacent the lips 23. The grooves 22 preferably are provided radially inwardly of the lips 23, as shown in FIG. 2, so as to assist in the deformation or deflection of the lips 23 radially inwardly. Hence, when in use, insertion of the bearing 2 with the bearing seal 10 in place within the housing bore causes deformation of the lips 23 which in turn ensures a positive seal between the outer race ring 4 and the housing 5. In this way a secure seal can be formed between the otherwise loose fitting of the outer race ring 4 in the housing 5.

A recess 6 in the static element or outer ring 4 is open to the axial outer face of the ring 4. This enables the bearing seal 10 and, in particular, the static sealing member 14 to be more easily positioned on the axial outer face of the bearing 2. When in use the bearing seal 10 is mounted on the face of the bearing 2 with the static sealing member 14 located in the recess 6. The bearing 2 is then clamped in position in the bearing housing 5 with the coating 12 forming a seal with the shoulder of the clamp 7 and is mounted on a shaft (now shown). So that the bearing seal 10 does not become inadvertently detached from the bearing 2 whilst outside of the housing 5, the minimum inner diameter of the static sealing member 14 is preferably substantially equal to the diameter of the recess 6 so that the static sealing member 14 fits tightly within the recess 6 without making the bearing seal 10 difficult to remove from the bearing 2 when necessary.

At the radial inner edge of the casing 11 a lip seal member 18 is provided similarly made of rubber, for example, or an alternative resilient sealing material. The lip seal member 18 has a lip seal element 16 and additionally an elastohydrodynamic (EHD) lip 17 which is described in detail in U.S. Pat. No. 4,799,808, the contents of which are incorporated herein by reference. The lip seal member 18 is designed to enable the bearing seal 10 to form a seal with the outer surface of the rotating element or inner race ring 3 of the bearing.

Axial holes 19 (one is shown) are provided in the casing 11 to enable venting, if needed. The holes 19 are covered by the coating 12 but can be opened, if desired, by cutting through the coating.

Figure 3:
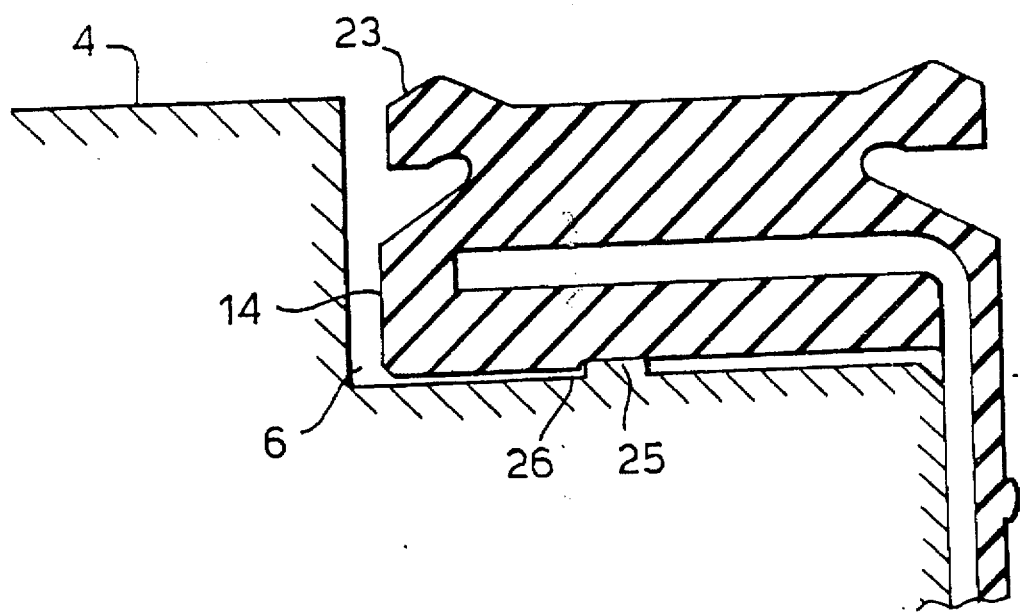
FIG. 3 is an enlarged sectional view of part of an alternative roller bearing in accordance with the present invention.
Figure 4:
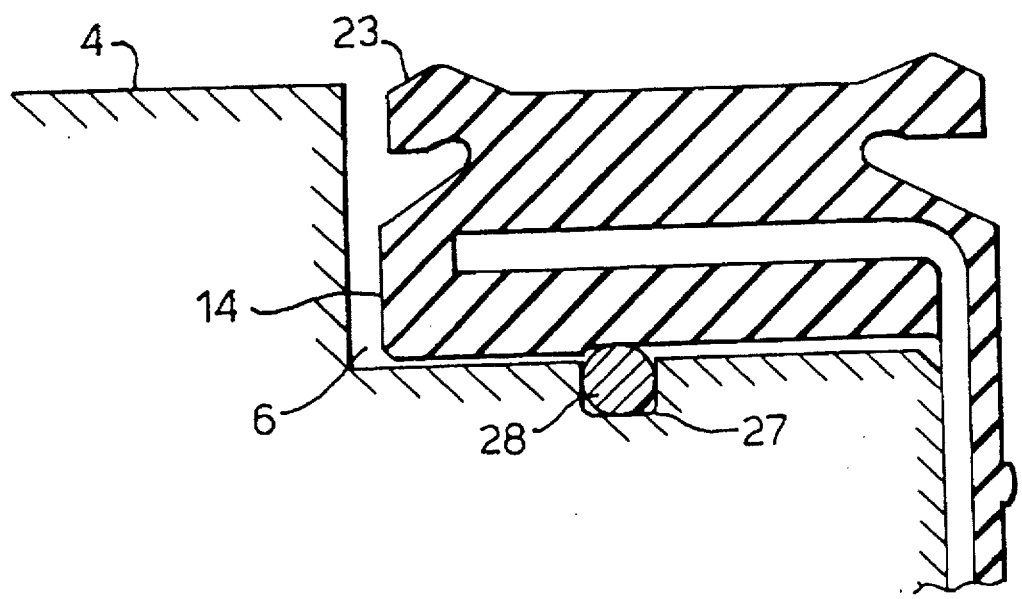
FIG. 4 is an enlarged sectional view of part of a further alternative roller bearing in accordance with the present invention.

With reference to FIG. 3, to assist the positioning of the bearing seal 10 on the end of the bearing 2, and, in particular, the location of the static sealing member 14 within the recess 6, the outer ring 4 may include, within the recess 6, a circular ridge 25 which engages with an inner shoulder 26 on the static sealing member 14. The ridge 25 also assists in holding the bearing seal 10 on the end of the bearing 2 when the bearing is removed from the housing 5. Alternatively, with reference to FIG. 4, the recess 6 may include a circular sealing groove 27 within which is located an o-ring or other sealing spring 28 which similarly abuts against the inner shoulder 26 on the static sealing element.

It will be seen from the above that the bearing seal 10 replaces what conventionally has been two separate seals; i.e. a dynamic seal between the inner and outer race rings of the bearing and an o-ring between the outer race ring and the bearing housing. Moreover, as the bearing seal is located adjacent the axial outer face of the bearing, the bearing seal is easier to position. Also, with the static sealing member 14, having a diameter approximately equal to the diameter of the housing bore and the axially outwardly projecting lips 23 having an outer diameter greater than the diameter of the housing bore, a secure positive seal between the static outer race ring 4 and the housing 5 can be provided. In addition, the bearing seal 10 described can be more rigid than conventional dynamic seals which ensures a more reliable seal between the inner and outer race rings 3 and 2.

What is claimed is:

1. In combination with a housing having a bore and with a bearing that includes an outer ring fitted into the bore of the housing, an inner ring located within the outer ring, and rolling elements between the outer and inner rings, the outer ring having a recess that opens radially outwardly and also axially out of one end of the ring, a seal for establishing a static barrier between the housing and the outer ring and a dynamic barrier between the outer and inner rings, said seal comprising: a generally rigid casing extending radially over that end of the outer ring out of which the recess opens, the casing having a margin near the inner race and an axially directed flange at its periphery, the flange extending into the recess of the outer ring; a first sealing member attached to the casing at its inner margin and establishing a dynamic fluid barrier along the inner ring; and a second sealing member attached to the flange of the casing and establishing a static seal barrier between a surface of the recess in the outer ring and the surface of the bore in the housing, the second sealing member being formed from a resilient sealing material and having a segment which contacts a surface of the recess in the outer ring and also having lips which when unrestrained have a diameter greater than the diameter of bore in the housing, but when the outer ring is in the bore are in contact with and are deflected inwardly by the housing, the second sealing member also having grooves located radially inwardly from and along the lips to accommodate the inward deflection of the lips, with the grooves as initially configured being at least partially occupied by the lips when the lips are deflected inwardly.

2. The combination according to claim 1 wherein the second sealing member extends axially between ends on that member, the lips of the second sealing member are at the ends of the second sealing member, and the grooves open out of the ends of the second sealing member.

3. The combination according to claim 1 wherein the first sealing member is formed from a resilient sealing material and has a lip which contacts the inner ring of the bearing.

4. The combination according to claim 1 wherein the outer ring of the bearing has a ridge which projects radially outwardly into the recess.

5. The combination according to claim 4 wherein the second sealing member has a shoulder which lies behind the ridge on the outer ring.

6. The combination according to claim 1 wherein the outer ring of the bearing has a groove that opens radially outwardly into the recess between the ends of the recess, and further comprising an annular element located in the groove of the outer ring and projecting out of that groove where it engages the second sealing member.

7. The combination according to claim 6 wherein the second member element has a shoulder which lies behind the annular element that projects from the groove in the outer ring.

8. In combination with a bearing having an outer ring, an inner ring located within the outer ring and rolling elements located between the rings for enabling one ring to rotate relative to the other ring about an axis of rotation, the outer ring having a recess which opens radially outwardly and lies along a radially outwardly presented surface and also opens axially out of an end of the outer ring, a seal for establishing static and dynamic fluid barriers at the bearing, said seal comprising: a substantially rigid casing directed generally radially and having an inner margin and an axially directed flange at its periphery; the inner margin being presented inwardly toward the inner ring and the flange extending into the recess of the outer ring; a first resilient sealing member attached to the casing at its inner margin and establishing a dynamic fluid barrier with the inner ring; and a second resilient sealing member attached to the casing along the flange such that the second sealing member lies along both the inwardly and outwardly presented surfaces of the flange, the portion of the second sealing member that lies radially inwardly from the flange being against the radially outwardly presented face of the recess, the portion of the second sealing member that lies outwardly from the flange having a lip at each end, with the lips forming the greatest diameter on the second sealing member, the second sealing member having grooves which are located immediately inwardly from the lips such that the grooves accommodate inward deflection of the lips, with the grooves as initially configured being at least partially occupied by the lips when the lips are deflected inwardly.

9. The combination according to claim 8 wherein the second sealing member extends between ends on that member and the grooves open out of the ends of the second sealing member.

10. The combination according to claim 8 wherein the first sealing member includes a lip which has an edge that is presented inwardly toward the axis and contacts the bearing.

11. The combination according to claim 8 wherein the outer ring of the bearing has a ridge which projects radially outwardly into the recess.

12. The combination according to claim 11 wherein the second sealing member has a shoulder which lies behind the ridge on the outer ring.

13. The combination according to claim 8 wherein the outer ring of the bearing has a groove that opens radially outwardly into the recess between the ends of the recess; and further comprising an annular element located in the groove of the outer ring and projecting out of that groove where it engages the second sealing member.

14. The combination according to claim 8 wherein the second sealing element has a shoulder which lies behind the annular element that projects from the groove in the ring.

15. A seal for establishing fluid barriers around an axis of rotation, said seal comprising: a casing having a radially directed portion provided with an inner margin and an axially directed flange at the periphery of the radially directed portion; a dynamic sealing member formed from a resilient material and attached to the casing at the inner margin of its radially directed portion, the dynamic sealing member having a lip capable of contacting a surface and establishing a dynamic fluid barrier along that surface; a static sealing member formed from a resilient material and fixed in position with respect to the flange of the casing where it lies along both the inwardly and outwardly presented surfaces of the flange, the static sealing member having a groove which opens out of the member, the static sealing member also having a lip which lies along the groove and is presented radially outwardly from the groove, so that the groove accommodates deflection of the lip radially inwardly with the groove as initially configured being at least partially occupied by the lip when the lip is deflected inwardly.

16. A seal according to claim 15 wherein the greatest diameter of the static sealing member lies along the lip.

17. A seal according to claim 15 wherein the lip has surfaces which converge toward an edge, and the edge forms the greatest diameter of the static sealing member.

18. A seal according to claim 15 wherein the static sealing member has a shoulder along the portion thereof that lies inwardly from the flange, with the shoulder being spaced radially from the radially directed portion of the casing.

19. A seal according to claim 15 wherein the groove opens axially out of an end of the static sealing member.

* * * * *